US012681659B2

(12) United States Patent
Fabec et al.

(10) Patent No.: US 12,681,659 B2
(45) Date of Patent: Jul. 14, 2026

(54) DEMULTIPLEXING STORAGE VOLUME BOUNDARIES WITHIN VIRTUAL STORAGE BLOCK DEVICE

(71) Applicant: INTERNATIONAL BUSINESS MACHINES CORPORATION, Armonk, NY (US)

(72) Inventors: Brian Ray Fabec, Round Rock, TX (US); Kevin Kuhner, Cary, NC (US); John Henry Welborn, Jr., Cary, NC (US); Kenny Huang, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/749,555

(22) Filed: Jun. 20, 2024

(65) Prior Publication Data

US 2025/0390244 A1 Dec. 25, 2025

(51) Int. Cl.
*G06F 3/06* (2006.01)

(52) U.S. Cl.
CPC .......... *G06F 3/0644* (2013.01); *G06F 3/0604* (2013.01); *G06F 3/0664* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 7,281,068 B2 | 10/2007 | Davis | |
| 7,702,894 B2 | 4/2010 | Waltermann | |

| | | | |
|---|---|---|---|
| 7,979,260 B1 | 7/2011 | Sobel | |
| 8,898,355 B2 | 11/2014 | Springfield | |
| 10,387,188 B2 | 8/2019 | Doggett | |
| 11,204,776 B2 | 12/2021 | Kim | |
| 11,635,970 B2 | 4/2023 | Raayman | |
| 2016/0283260 A1* | 9/2016 | Bacher ............... G06F 9/45545 | |
| 2017/0315739 A1* | 11/2017 | Ratra .................... G06F 3/0619 | |
| 2021/0117358 A1* | 4/2021 | LePage ................. G06F 3/0644 | |

(Continued)

FOREIGN PATENT DOCUMENTS

| | | |
|---|---|---|
| KR | 101709116 B1 | 2/2017 |

OTHER PUBLICATIONS

Array of partitions is no different than array of ext4 partitions, retrieved Jun. 24, 2024 from from https://en.wikipedia.org/wiki/Ext4, 10 pgs.

(Continued)

*Primary Examiner* — Arpan P. Savla
*Assistant Examiner* — Edmund H Kwong
(74) *Attorney, Agent, or Firm* — CHIP LAW GROUP

(57) ABSTRACT

An architecture for demultiplexing volumes in a storage device includes a virtual machine. A guest operating system is in the virtual machine. The architecture further includes a storage pool of virtual storage blocks and a hypervisor. The hypervisor is configured to organize the storge pool of virtual storage blocks into a plurality of virtual storage partition tables. Device addresses are assigned to the plurality of virtual storage partition tables. The plurality of virtual storage partition tables and the devices addresses are organized into a virtual storage device. The device addresses are presented to the guest operating system in the virtual machine.

14 Claims, 6 Drawing Sheets

(56) References Cited

U.S. PATENT DOCUMENTS

2022/0350716 A1* 11/2022 Silakov ............... G06F 11/2094
2023/0176884 A1* 6/2023 Franciosi ........... G06F 12/0238
718/1

OTHER PUBLICATIONS

Vmware or qcow2 differentiation, retrieved from Jun. 24, 20024 from https://en.wikipedia.org/wiki/Ext4, 2 pgs.

Disk partitioning, retrieved Jun. 24, 2024 from https://en.wikipedia.org/w/index.php?title=Disk_partitioning&oldid=1202933508, 7 pgs.

Red Hat Virtualization 4.3 Technical Reference, retrieved Jun. 24, 2024 from https://access.redhat.com/documentation/en-us/red_hat_virtualization/4.3/html/technical_reference/qcow2, 234 pgs.

VSphere Virtual Machine Administration, retrieved Jun. 24, 2024 from https://docs.vmware.com/en/VMware-vSphere/7.0/com.vmware.vsphere.vm_admin.doc/GUID-90FD3678-AC9F-40CC-BB66-F499141E2B99.html, 322 pgs.

Array of partitions is no different than array of ext4 partitions.

Vmware or qcow2 differentiation.

* cited by examiner

| partition | size | start | end |
|---|---|---|---|
| Guest Index List | 8K | 0 | 1 |
| G1 metadata | 8K | 34 | 35 |
| G1 devmap | 8K | 50 | 51 |
| G2 metadata | 8K | 51 | 52 |
| G2 devmap | 8K | 53 | 54 |
| G1HDD0 | 10GB | 1000 | 2622439 |
| G1HDD1 | 10GB | 2622440 | 5243879 |
| G2HDD0 | 25GB | 5243879 | 11797478 |
| G2HDD1 | 25GB | 11797479 | 18351078 |
| ... | ... | ... | ... |
| G<N>... | ... | ... | ... |

G1 = Guest 1 data
G2 = Guest 2 data

FIG. 6

DEMULTIPLEXING STORAGE VOLUME BOUNDARIES WITHIN VIRTUAL STORAGE BLOCK DEVICE

BACKGROUND

Technical Field

The present disclosure generally relates to data storage devices technology, and more particularly, to demultiplexing storage volume boundaries within a virtual storage block device.

Description of the Related Art

Referring to FIG. 1, a traditional Operating System (OS) typically uses a single boot device to be present and available at boot time. As shown in the figure, every device address in the operating system traces back to a single hard disk and file found for a specific hypervisor in a direct pass-through scheme. There can be multiple disks present in a system, but generally speaking, one disk is primarily used. A hypervisor will have a storage pool of multiple disks that are presented to a virtual machine as a one-to-one mapping (for example, disk "W" is presented as hard drive "A", disk "X" is presented as hard drive "B", and so on. The hypervisor relies on the operating system to understand what the relationship is between the hard drives ("A", "B", "C", and "D") and where to seek boot information.

This paradigm has extended to the Cloud, which limits the number of boot disks a virtual server instance (VSI) can have to only one. There are exceptions to the above rule, where z/OS is one of the exceptions. In z/OS, multiple block/tape devices or emulated disk files (CKD) can be required to allow z/OS to boot successfully. In cloud computing operating systems, each device may have its own address. As the industry attempts to bridge the conventional operating system architecture with cloud computing operating systems, the pass-through scheme of conventional operating systems is not compatible with the virtual architecture in cloud computing networks.

SUMMARY

According to an embodiment of the present disclosure, an architecture for demultiplexing volumes in a storage device is disclosed. The architecture includes a virtual machine. A guest operating system is in the virtual machine. The architecture further includes a storage pool of virtual storage blocks and a hypervisor. The hypervisor is configured to organize the storge pool of virtual storage blocks into a plurality of virtual storage partition tables. Device addresses are assigned to the plurality of virtual storage partition tables. The plurality of virtual storage partition tables and the devices addresses are organized into a virtual storage device. The device addresses are presented to the guest operating system in the virtual machine.

According to an embodiment of the present disclosure, a computer implemented method for demultiplexing volumes in a storage device is disclosed. The method includes organizing, by a hypervisor, a storge pool of virtual storage blocks into a plurality of virtual storage partition tables. The hypervisor assigns device addresses to the plurality of virtual storage partition tables. The plurality of virtual storage partition tables and the devices addresses are organized into a virtual storage device. The device addresses are presented to a guest operating system in a virtual machine.

According to an embodiment of the present disclosure, a computing device includes a processor operating a virtual machine, a guest operating system in the virtual machine, a storage pool of virtual storage blocks, and a hypervisor. The computing device further includes a memory coupled to the processor. The memory stores instructions to cause the hypervisor to perform acts comprising organizing the storge pool of virtual storage blocks into a plurality of virtual storage partition tables. The hypervisor assigns device addresses to the plurality of virtual storage partition tables. The plurality of virtual storage partition tables and the devices addresses are organized into a virtual storage device. The device addresses are presented to a guest operating system in a virtual machine.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 6 is a diagrammatic view of a virtual block storage device attached to a hypervisor, consistent with embodiments.

DETAILED DESCRIPTION

Figure 1:
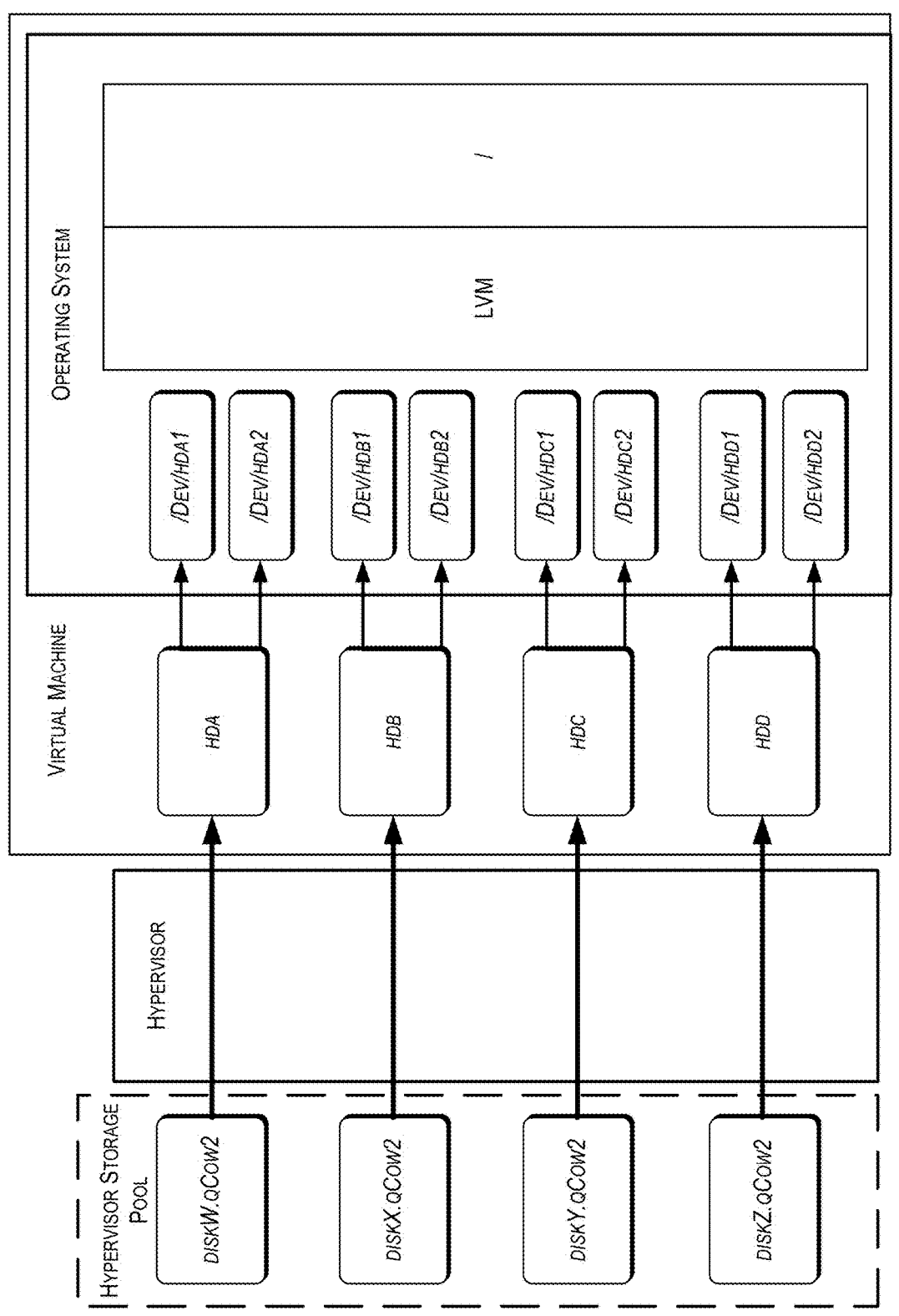
FIG. 1 is a diagrammatic view of a conventional architecture for virtual storage on a cloud-based server.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Definitions

Hypervisor, as used herein, refers to a type of computer software, firmware or hardware that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems.

Abstraction layer, as used herein, refers to software that translates a high-level request into the low-level commands required to perform the operation (for example, the programming interface (API) between an application and the operating system). High-level calls are made to the operating system, which executes the necessary instructions to perform the task.

Overview

The present disclosure generally relates to virtual storage devices and methods of structuring block devices in a virtual storage device within a Cloud environment. A hypervisor generally provides the contents of a root filesystem required for boot. The guest operating system within the virtual machine will typically partition the single disk image with a file system (ext4, xfs, etc.). For non-standard operating systems (for example, z/OS®), where the operating system does not support partitioning, the boot disk is usually more than one disk image (perhaps hundreds of images). In constrained environments where the hypervisor can't scale to that volume of unique boot virtual storage disks, a solution is needed for the hypervisor to support multiple disk images within a single virtual storage disk.

The subject technology packages multiple block devices into a single disk device using a combination of metadata, partition management, and hypervisor support. Virtual storage partition tables are used with virtual storage boundaries (device addresses) that are needed by a virtual platform's operating system to run. The hypervisor will include mappings between regions of a virtual disk and will present the mappings as unique device addresses. For example, a disk in the hypervisor storage pool will be presented to the hypervisor. The hypervisor will present device addresses to the operating system in a virtual machine.

Example Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one or more storage devices that may include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing.

A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
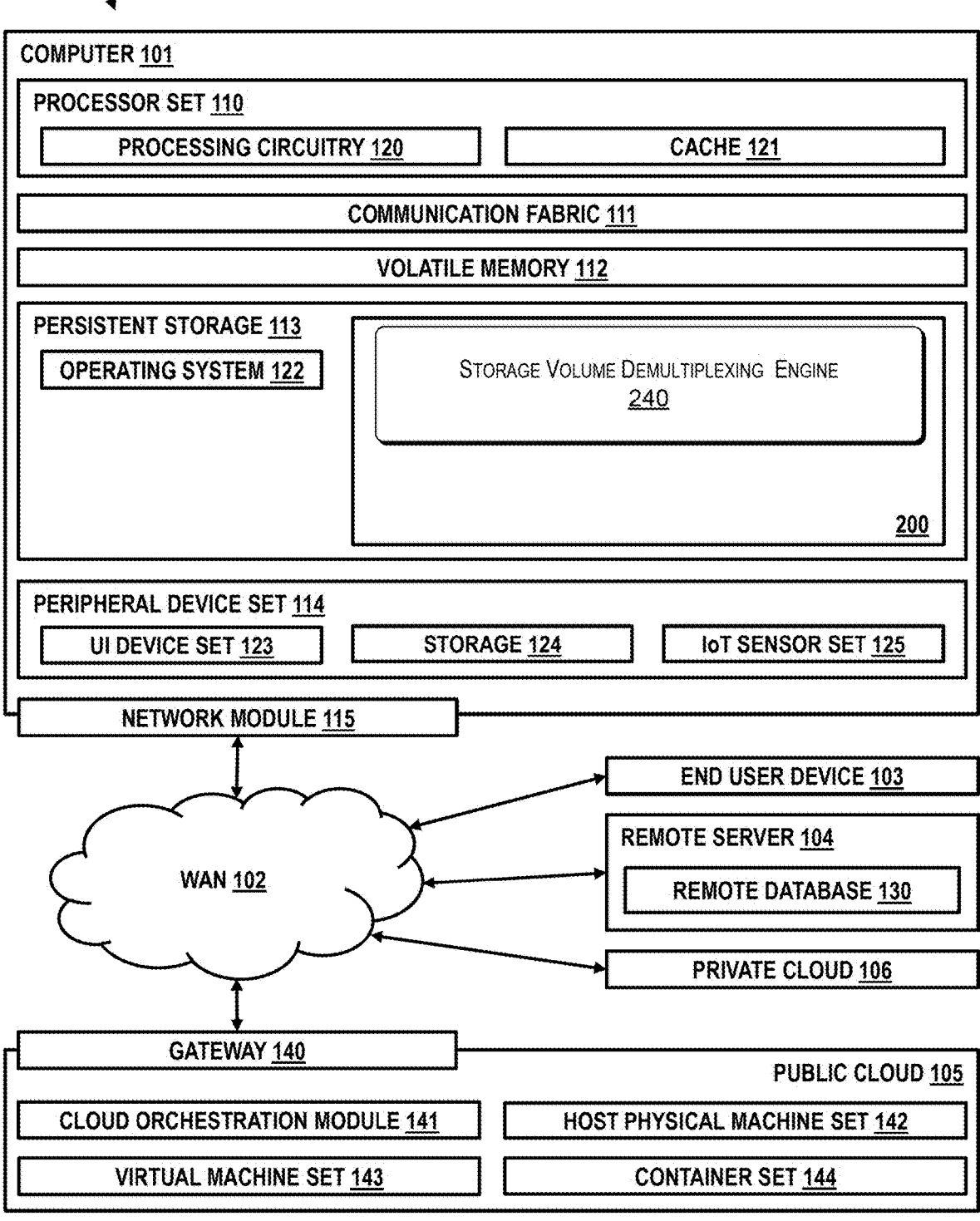
FIG. 2 is a block diagram of a computing environment for demultiplexing volumes in a virtual storage device, consistent with an illustrative embodiment.

Referring to FIG. 2, computing environment 100 includes an example of an environment for the execution of at least some of the computer code involved in performing the inventive methods, such as the improved code 200. The improved code 200 may include a storage volume demultiplexing engine 240. The storage volume demultiplexing engine 240 may operate according to one or more of the methods disclosed in further detail below. In addition to code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 2. On the other hand, computer 101 is not required to be in a cloud except to any extent as may be affirmatively indicated.

PROCESSOR SET 110 includes one, or more, computer processors of any type now known or to be developed in the future. For the instant disclosure, the processor set 110 includes for example a central processing unit (CPU) and an accelerator. In some embodiments, a different type of processing element may be used instead of the CPU, (for example, a GPU or other process dedicated/specialized unit). Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. Code 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Example System Architecture

Figure 3:
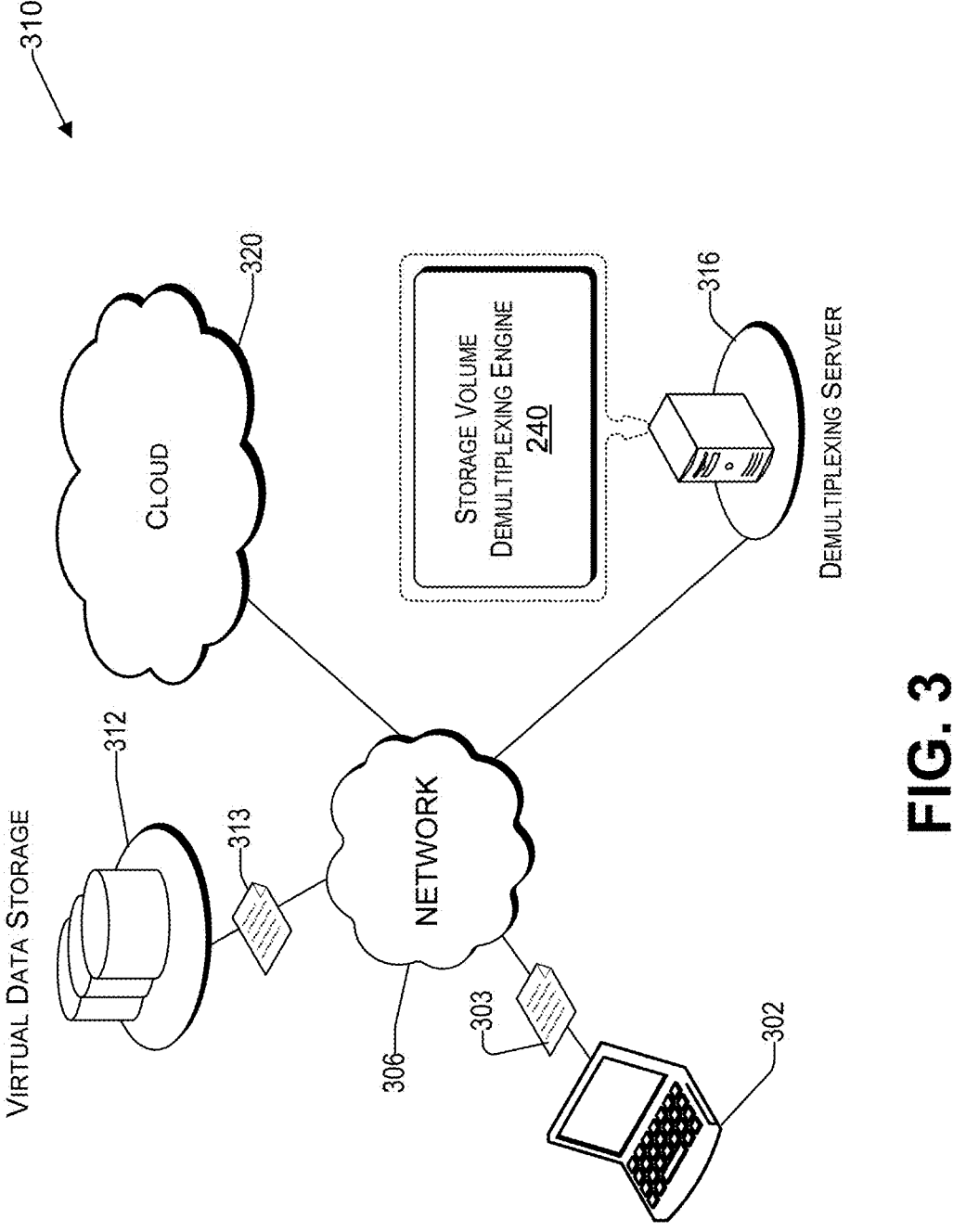
FIG. 3 is a block diagram of an architecture for demultiplexing volumes in a virtual storage device, consistent with an illustrative embodiment.

FIG. 3 illustrates an example architecture 310 for demultiplexing volumes in a virtual storage device. Architecture 310 includes a network 306 that allows various elements to communicate with each other, including for example, such as a computer 302, virtual data storage 312, demultiplexing server 316, and the cloud 320. The demultiplexing server 316 may operate under the computing environment described above in FIG. 2. The demultiplexing server 216 may operate the code 200, including the storage volume demultiplexing engine 240.

The network 306 may be, without limitation, a local area network ("LAN"), a virtual private network ("VPN"), a cellular network, the Internet, or a combination thereof. For example, the network 306 may include a mobile network that is communicatively coupled to a private network, sometimes referred to as an intranet that provides various ancillary services, such as communication with various application stores, libraries, and the Internet. The network 306 allows the storage volume demultiplexing engine 240, which is a software program running on demultiplexing server 316, to communicate with the virtual data storage 312, and/or the cloud 320, to provide demultiplexing of virtual data storage 312. In some embodiments, programming or control of the storage volume demultiplexing engine 240 on a target virtual data storage 312 may occur via data packets 303 sent through the computer 302. The virtual data storage 312 may include virtual files and virtual devices including virtual machines, virtual disks, and virtual operating systems that will be processed under one or more techniques described here. In one embodiment, the demultiplexing by the storage volume demultiplexing engine 340 is performed at least in part on the cloud 320.

For purposes of later discussion, the computer 302 appears as a user device appear in the drawing, to represent some examples of the computing devices that may be provide a user interface for administrator users. Today, user devices typically take the form of desktop computers, portable handsets, smart-phones, tablet computers, personal digital assistants (PDAs), and smart watches, although they may be implemented in other form factors, including consumer, and business electronic devices. While the virtual data storage 312 and the storage volume demultiplexing engine 240 are illustrated by way of example to be on different platforms, it will be understood that in various embodiments, the virtual data storage 312 and the demultiplexing server 316 may be combined. In other embodiments, these computing platforms may be implemented by virtual computing devices in the form of virtual machines or software containers that are hosted in a cloud 320, thereby providing an elastic architecture for processing and storage.

Example Demultiplexing Architecture

Figure 4:
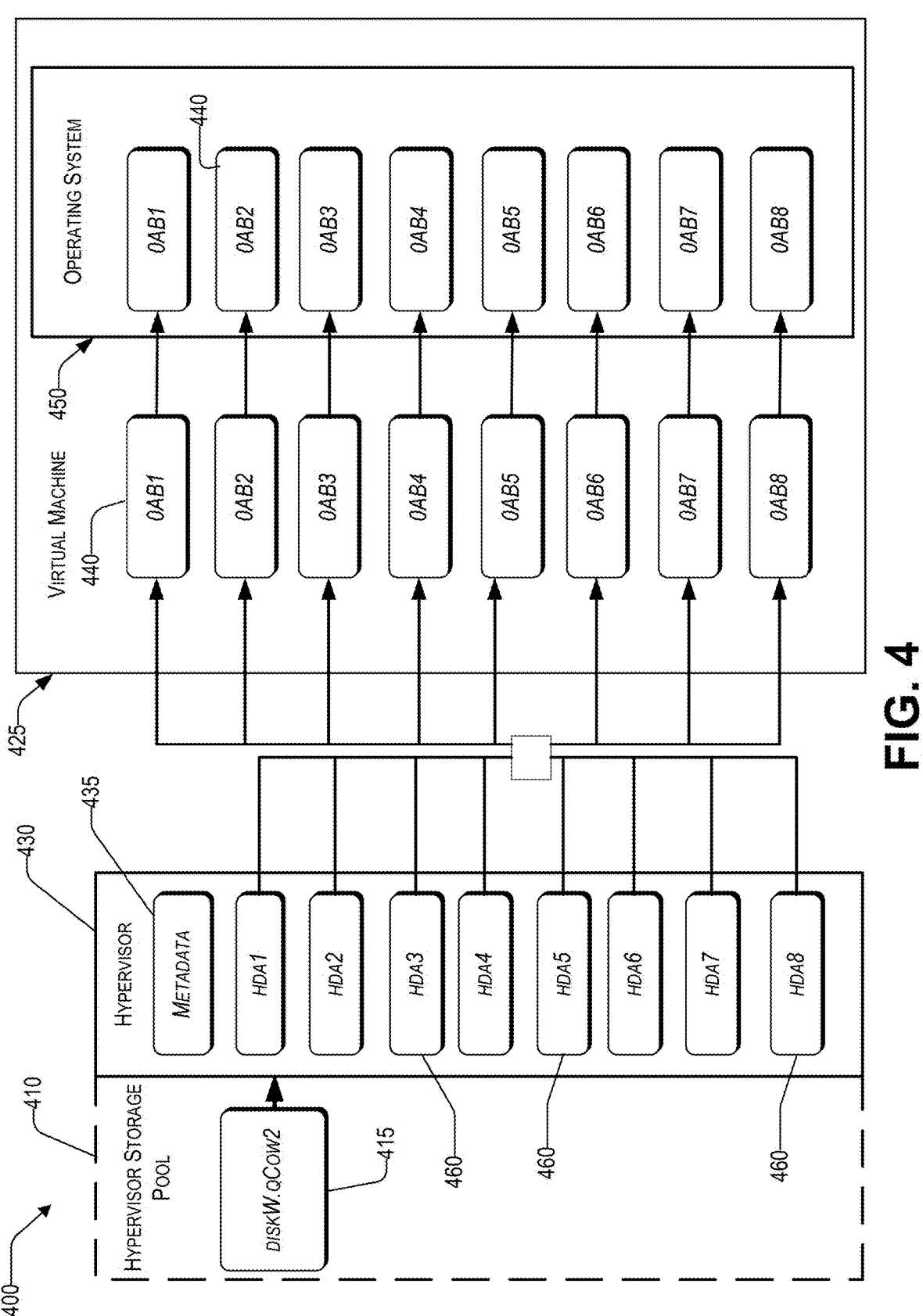
FIG. 4 is a diagrammatic view of an architecture for demultiplexing virtual storage on a cloud-based server, according to an embodiment.

FIG. 4 shows an architecture 400 for demultiplexing virtual storage on a cloud-based server according to an illustrative embodiment. In the architecture 400, a hypervisor 430 may attach unique virtual storage disks 415 each including a single disk image which is then mounted within the virtual machine 425. The virtual storage disk 415 includes a partition table for the virtual storage blocks to describe the storage volume boundaries of the collection of disk files, which can be accessed directly via the hypervisor. The hypervisor storage pool 410 is shown with a single virtual storage disk 415. It will be understood however, that multiple virtual storage disks 415 may be present. The hypervisor 430 is modified from a conventional configuration to include metadata 435 collected from the virtual storage blocks. Metadata 435 obtained may be specific to the hypervisor 430 and may contain anything related to the guest, such as the guest configuration (for example, number of processors, memory, etc.). In some embodiments, the disk addresses may be defined within the metadata 435, or may be defined as part of the partition table(s). The partition tables may be globally unique identifier partition tables (GPT). The hypervisor 430 may look at the partition tables and determine the addresses based on the labels defined within the partition tables. Or in some embodiments, the hypervisor 430 may use the metadata 435 to map the hdN hard disks with 0abN operating system device addresses, such as those seen in FIG. 4. In some embodiments, the various storage disks 415 in which data blocks are stored may be listed in the hypervisor 430 and presented to the virtual machine 425 as emulated hard disk devices 460. The metadata 435 allows the hypervisor 430 to present individual device addresses 440 to the virtual machine operating system 450. A specific disk in the hypervisor storage pool contains regions. The virtual machine operating system 450 sees the regions as a disk because the hypervisor 430 is providing an entire emulated disk 460 based on the region defined. Thus, as will be appreciated, the virtual machine operating system 450 sees individual device addresses 440 which represent a region on a disk rather than a specific disk (for example, virtual storage disk 415) in the hypervisor storage pool 410.

As will be appreciated, the architecture 400 removes the filesystem abstraction layer generally present in conventional architectures to allow the hypervisor 430 to directly manipulate the data off a raw block device (not shown but would be understood by those of ordinary skill in the art to be present between the storage pool for qCOW2 and the hypervisor 430) by managing and enforcing the boundaries as opposed to the operating system doing so. One such manner is to create a raw block device image that doesn't include volumes with a filesystem which holds the boot data, but instead leverages a new or existing partition table technology, to index the contents of the image such that the hypervisor 430 can access the contents of the boot data directly via the boundaries laid out by the table. For example, in Table 1, a table with a default block size of 512 bytes shows the starting block sector and number of blocks for each boot volume required by the hypervisor 430 to start the guest operating system 450. Additional sectors can be reserved for metadata type information which can be leveraged by the hypervisor 430. The hypervisor 430 may explore the table or be told the sectors where the boot volumes reside.

TABLE 1

| Partition | Size | Start | End |
|---|---|---|---|
| Metadata | 8K | 34 | 49 |
| Devmap | 8K | 50 | 65 |

TABLE 1-continued

| Partition | Size | Start | End |
|---|---|---|---|
| CKD0 | * | 66 | * |
| CKD1 | * | * | * |
| CKD2 | * | * | * |
| . . . | * | * | * |
| CKD | | | |

Example Methodology

Figure 5:
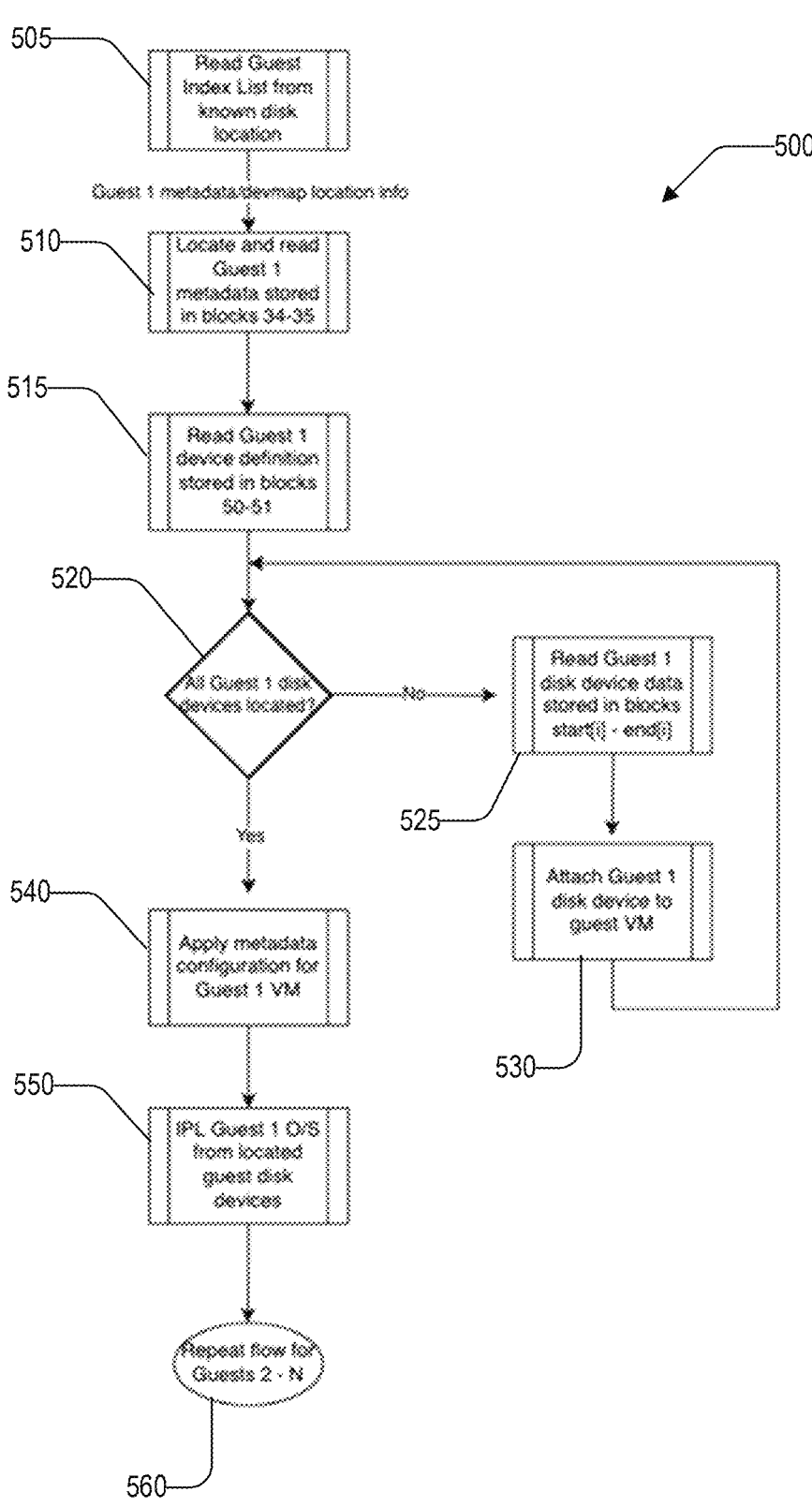
FIG. 5 is a flowchart of a method of demultiplexing storage volume boundaries within virtual storage block device, according to an embodiment.

FIG. 5 shows a method for booting a guest operating system in a cloud environment by a hypervisor according to an embodiment. The booting process may be based on metadata and guest device information stored within partitions on a single, attached virtual block storage device. The hypervisor reads 505 a guest index list from a known disk location. The hypervisor locates 510 and reads metadata from the guest operating system's virtual block storage device. In the example provided within the process, the hypervisor is reading specific sector boundary addresses (blocks 34-35) within the disk containing the metadata. It should be understood that the specific block addresses are provided for illustration only to help the reader correlate the process to information provided below with reference to FIG. 6. The information may include device mapping location information. The hypervisor may read 515 device definition for the guest operating system. In the example provided, certain block addresses are used which correlate to blocks referenced in FIG. 6. The hypervisor may determine 520 whether all virtual block storage devices for the guest operating system have been located. If not, the hypervisor may read 525 all the blocks available in a virtual block storage device. When a virtual block storage device is located and read, the virtual block storage device may be attached 530 to the guest virtual machine. After all block virtual storage devices are attached to the virtual machine, the hypervisor may apply a metadata configuration for the guest virtual machine. The hypervisor may perform 550 an initial program load (IPL) of the guest operating system from the located guest disk devices (virtual block storage devices). The method 500 may be repeated 560 for additional guest operating systems found within the virtual machine. An example layout of a virtual block storage device attached to a hypervisor is shown in FIG. 6. FIG. 6 maps information to the example elements referenced in FIG. 5 in terms of the block addresses used, and is an example of what the partition table would look like, such as the metadata and its boundary (block addresses), for two guests (Guest 1 and Guest 2). The two figures are directly related to one another. When viewed together, FIG. 5 and FIG. 6 show how a hypervisor can run multiple tenants and provide hypervisor enforced boundaries within a single shared block device. Accordingly, it should be appreciated that the subject technology modifies the use of the hypervisor in such a way that the hypervisor can even manage a system with multiple guests as shown in the embodiments of FIG. 5 and FIG. 6.

Enforcement

Still referring to FIG. 5 and FIG. 6, it should be appreciated that there are two types of enforcement that may be provided by the subject technology; both at the hypervisor level. The first enforcement is the enforcement of the boundaries (block addresses) as described within the partition table for a particular guest. The second enforcement as shown within FIG. 5 and FIG. 6 describes an enforcement of the boundary (again at the hypervisor level) to ensure multiple guests are assigned their specific boundaries (block addresses) and do not mistakenly intersect with one another.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An architecture for demultiplexing volumes in a storage device in a cloud computing environment, the architecture comprising:

a virtual machine comprising multiple quest operating systems, wherein a guest operating system of the multiple guest operating systems requires a plurality of emulated hard disk devices to boot;

a storage pool of virtual storage blocks; and a hypervisor configured to:

organize the storage pool of the virtual storage blocks into a plurality of virtual storage partition tables;

assign device addresses to the plurality of virtual storage partition tables;

organize the plurality of virtual storage partition tables and the device addresses into a virtual storage device, wherein the virtual storage device includes boot data for the quest operating system, and the boot data comprises data blocks;

map the device addresses to the virtual storage device, wherein the virtual storage device includes regions, and individual ones of the device addresses represent a region of the regions on the virtual storage device;

present the device addresses to the guest operating system in the virtual machine, wherein based on the device addresses, the regions of the virtual storage device are presented, to the guest operating system, as the plurality of emulated hard disk devices, the guest operating system sees each region of the regions of the virtual storage device as an entire emulated hard disk device of the plurality of emulated hard disk devices, and each emulated hard disk device of the plurality of emulated hard disk devices corresponds to a respective data block of the data blocks of the boot data within the virtual storage device; and assign, to each guest operating system of the multiple quest operating systems, specific boundaries of the plurality of virtual storage partition tables to prevent intersection between the multiple quest operating systems, wherein each of the specific boundaries correspond to a respective device address of the device addresses assigned to the plurality of virtual storage partition tables.

2. The architecture of claim 1, wherein the virtual storage device further includes a plurality of virtual disk images.

3. The architecture of claim 2, wherein:

the individual ones of the device addresses reside on one of the plurality of virtual disk images.

4. The architecture of claim 1, wherein the hypervisor is further configured to collect metadata from the virtual storage blocks.

5. The architecture of claim 4, wherein the hypervisor is further configured to use the metadata to assign the device addresses and to present the device addresses to the guest operating system in the virtual machine.

6. A computer-implemented method for demultiplexing volumes in a storage device in a cloud computing environment, the computer-implemented method comprising:

organizing, by a hypervisor, a storge pool of virtual storage blocks into a plurality of virtual storage partition tables;

assigning, by the hypervisor, device addresses to the plurality of virtual storage partition tables;

organizing the plurality of virtual storage partition tables and the devices addresses into a virtual storage device;

mapping the device addresses to the virtual storage device, wherein the virtual storage device includes regions, and individual ones of the device addresses represent a region of the regions on the virtual storage device;

presenting the device addresses to a guest operating system of multiple guest operating systems in a virtual machine, wherein the virtual storage device includes boot data for the guest operating system, and the boot data comprises data blocks, the guest operating system requires a plurality of emulated hard disk devices to boot, based on the device addresses, the regions of the virtual storage device are presented, to the guest operating system, as the plurality of emulated hard disk devices, the guest operating system sees each region of the regions of the virtual storage device as an entire emulated hard disk device of the plurality of emulated hard disk devices, and each emulated hard disk device of the plurality of emulated hard disk devices corresponds to a respective data block of the data blocks of the boot data within the virtual storage device; and assigning, to each quest operating system of the multiple quest operating systems specific boundaries of the plurality of virtual storage partition tables to prevent intersection between the multiple quest operating systems, wherein each of the specific boundaries correspond to a respective device address of the device addresses assigned to the plurality of virtual storage partition tables.

7. The computer-implemented method of claim 6, further comprising storing a plurality of virtual disk images in the virtual storage device.

8. The computer-implemented method of claim 7, wherein:

the individual ones of the device addresses reside on one of the plurality of virtual disk images.

9. The computer-implemented method of claim 6, further comprising collecting, by the hypervisor, metadata from the virtual storage blocks.

10. The computer-implemented method of claim 9, further comprising using, by the hypervisor, the metadata to assign the device addresses and to present the device addresses to the guest operating system in the virtual machine.

11. A computing device for demultiplexing volumes in a storage device in a cloud computing environment, the computing device comprising:

a processor configured to operate:

a virtual machine comprising multiple guest operating systems, wherein a guest operating system of the multiple guest operating systems requires a plurality of emulated hard disk devices to boot;

a storage pool of virtual storage blocks; and a hypervisor; and a memory coupled to the processor, the memory storing instructions to cause the hypervisor to perform operations comprising:

organizing the storage pool of the virtual storage blocks into a plurality of virtual storage partition tables;

assigning device addresses to the plurality of virtual storage partition tables;

organizing the plurality of virtual storage partition tables and the devices addresses into a virtual storage device, wherein the virtual storage device includes boot data for the quest operating system, and the boot data comprises data blocks;

mapping the device addresses to the virtual storage device, wherein the virtual storage device includes regions, and individual ones of the device addresses represent a region of the regions on the virtual storage device;

presenting the device addresses to the guest operating system in the virtual machine, wherein based on the device addresses, the regions of the virtual storage device are presented, to the guest operating system, as the plurality of emulated hard disk devices, the guest operating system sees each region of the regions of the virtual storage device as an entire emulated hard disk device of the plurality of emulated hard disk devices, and each emulated hard disk device of the plurality of emulated hard disk devices corresponds to a respective data block of the data blocks of the boot data within the virtual storage device; and assigning, to each guest operating system of the multiple guest operating systems, specific boundaries of the plurality of virtual storage partition tables to prevent intersection between the multiple guest operating systems, wherein each of the specific boundaries correspond to a respective device address of the device addresses assigned to the plurality of virtual storage partition tables.

12. The computing device of claim 11, wherein the instructions further cause the hypervisor to perform the operations comprising storing a plurality of virtual disk images in the virtual storage device.

13. The computing device of claim 12, wherein:

the individual ones of the device addresses reside on one of the plurality of virtual disk images.

14. The computing device of claim 11, wherein the instructions further cause the hypervisor to perform the operations comprising:

collecting, by the hypervisor, metadata from the virtual storage blocks; and using, by the hypervisor, the metadata to assign the device addresses and to present the device addresses to the guest operating system in the virtual machine.

* * * * *